United States Patent [19]

Zavis et al.

[11] Patent Number: 5,596,263
[45] Date of Patent: Jan. 21, 1997

[54] ELECTRICAL POWER DISTRIBUTION SYSTEM APPARATUS-RESIDENT PERSONALITY MEMORY MODULE

[75] Inventors: Wayne M. Zavis, Cary; Jeffery C. Mizener, Raleigh, both of N.C.; James J. Honochick, Ridgeland; Michael A. Bellin, Brandon, both of Miss.; Carl J. Laplace, Raleigh, N.C.

[73] Assignee: Siemens Energy & Automation, Inc., Alpharetta, Ga.

[21] Appl. No.: 160,696

[22] Filed: Dec. 1, 1993

[51] Int. Cl.⁶ .................................................. G05F 1/14
[52] U.S. Cl. ........................................ 323/255; 323/340
[58] Field of Search ................................ 323/255, 256, 323/257, 258, 340, 341, 342, 343

[56] References Cited

U.S. PATENT DOCUMENTS

| | | | |
|---|---|---|---|
| 3,743,921 | 7/1973 | Legg et al. | 323/258 |
| 4,000,443 | 12/1976 | Lever | 362/928 |
| 4,010,401 | 3/1977 | Yasumatsuya et al. | 315/379 |
| 4,143,417 | 3/1979 | Wald et al. | 364/900 |
| 4,245,318 | 1/1981 | Eckart et al. | 364/481 |
| 4,293,812 | 10/1981 | Kubach et al. | 323/272 |
| 4,340,849 | 7/1982 | Kuhn | 322/28 |
| 4,351,012 | 9/1982 | Elms et al. | 361/96 |
| 4,377,836 | 3/1983 | Elms et al. | 361/96 |
| 4,377,837 | 3/1983 | Matsko et al. | 361/105 |
| 4,419,619 | 12/1983 | Jindrick et al. | 323/257 |
| 4,431,988 | 2/1984 | Molusis et al. | 340/712 |
| 4,467,434 | 8/1984 | Hurley et al. | 364/483 |
| 4,481,512 | 11/1984 | Tscheulin et al. | 340/825.5 |
| 4,507,526 | 3/1985 | Thoma | 200/38 R |
| 4,527,285 | 7/1985 | Kekas et al. | 455/607 |
| 4,535,409 | 8/1985 | Jindrick et al. | 364/481 |
| 4,589,052 | 5/1986 | Dougherty | 361/98 |
| 4,612,617 | 9/1986 | Laplace et al. | 364/483 |
| 4,628,397 | 12/1986 | Gareis et al. | 361/98 |
| 4,631,625 | 12/1986 | Alexander et al. | 361/94 |
| 4,672,501 | 6/1987 | Bilac et al. | 361/96 |
| 4,694,373 | 9/1987 | Demeyer | 361/96 |
| 4,695,737 | 9/1987 | Rabon et al. | 323/257 |
| 4,728,914 | 3/1988 | Morris et al. | 335/6 |
| 4,733,158 | 3/1988 | Marchione et al. | 323/258 |
| 4,748,341 | 5/1988 | Gupta | 323/258 |
| 4,749,364 | 6/1988 | Arney et al. | 439/372 |
| 4,751,605 | 6/1988 | Mertz et al. | 361/91 |
| 4,752,853 | 6/1988 | Matsko et al. | 361/94 |
| 4,780,786 | 10/1988 | Weynachter et al. | 361/87 |
| 4,794,356 | 12/1988 | Yu et al. | 335/13 |
| 4,794,484 | 12/1988 | Matsko et al. | 361/93 |

(List continued on next page.)

FOREIGN PATENT DOCUMENTS

| | | | |
|---|---|---|---|
| 0193732 | 1/1986 | European Pat. Off. | G01R 31/00 |
| 0193449 | 2/1986 | European Pat. Off. | H02H 3/93 |
| 0279691 | 8/1988 | European Pat. Off. | H02H 3/04 |
| 2513436 | 9/1982 | France | H01H 71/74 |
| 0493272 | 12/1991 | France | H02H 71/74 |
| 4072927 | 4/1985 | Japan | H04B 7/26 |

OTHER PUBLICATIONS

Personal Computer Memory Card International Association pp. 1–4, Mar. 1992.

*Primary Examiner*—Jeffrey L. Sterrett
*Attorney, Agent, or Firm*—Richard M. Ludwin; Peter A. Luccarelli, Jr.

[57] ABSTRACT

An electrical apparatus (100) line actuator (102), such as a voltage regulator or circuit breaker, has resident therein a personality module, electronically reconfigurable memory device (126) which stores actuator operational information, such as specifications (132), historical and maintenance information. An apparatus controller (106) communicates with the personality module (126) and can change the operational information stored therein. If either or both of the controller (106) and actuator (102) is replaced at a site, the controller (106) of the replacement apparatus configuration (100) can read the operational information stored in the personality module (126) and adapt its operational interaction with the actuator (102) in conformance with the information.

15 Claims, 8 Drawing Sheets

U.S. PATENT DOCUMENTS

| | | | |
|---|---|---|---|
| 4,814,712 | 3/1989 | Burton et al. | 324/424 |
| 4,816,738 | 3/1989 | Nicolas | 323/258 |
| 4,827,369 | 5/1989 | Saletta et al. | 361/96 |
| 4,853,608 | 8/1989 | Schrade | 323/258 |
| 4,860,145 | 8/1989 | Klingbiel | 323/258 |
| 4,870,531 | 9/1989 | Danek | 361/93 |
| 4,888,545 | 12/1989 | Celenza et al. | 323/258 |
| 4,945,443 | 7/1990 | DeBiasi et al. | 361/93 |
| 4,958,252 | 8/1990 | Murphy | 361/93 |
| 5,055,766 | 10/1991 | McDermott et al. | 323/255 |
| 5,117,175 | 5/1992 | Pettigrew et al. | 323/256 |
| 5,136,233 | 8/1992 | Klinkenberg et al. | 323/343 |
| 5,155,672 | 10/1992 | Brown | 323/155 |
| 5,182,685 | 1/1993 | Krause et al. | 360/78.13 |
| 5,198,744 | 3/1993 | Kohl et al. | 322/33 |
| 5,204,798 | 4/1993 | Scott | 361/93 |
| 5,247,682 | 9/1993 | Kondou et al. | 395/700 |
| 5,267,211 | 11/1993 | Kobayashi et al. | 365/228 |
| 5,335,329 | 8/1994 | Cox | 395/325 |
| 5,428,551 | 6/1995 | Trainor et al. | 323/255 |

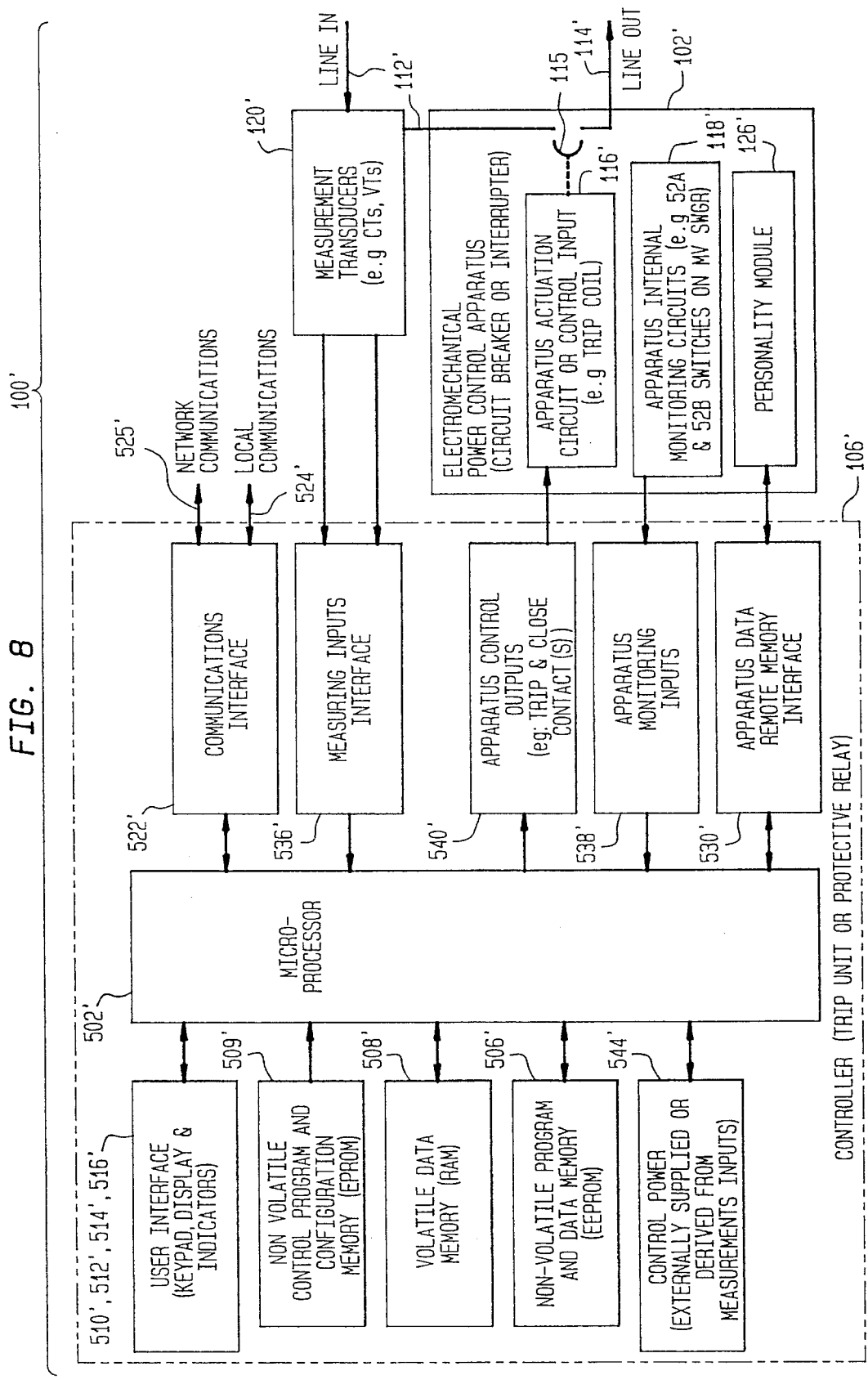

ELECTRICAL POWER DISTRIBUTION SYSTEM APPARATUS-RESIDENT PERSONALITY MEMORY MODULE

BACKGROUND OF THE INVENTION

1. Cross Reference to Related Applications

This application is related to U.S. patent application Ser. No. 08/120,720, "Expansion Chassis For A Voltage Regulator Controller", filed on Sept. 13, 993; and U.S. patent application Ser. No. 8/101,133, "Removable Field Programmable Data Memory Module" filed on Aug. 2, 1993, now U.S. Pat. No. 5,455,505, both of which are incorporated herein by reference in their entireties.

2. Field of the Invention

This invention relates to line actuators and related control electrical apparatus, such as circuit protection and control devices, for electrical power distribution system apparatus.

Line control apparatus or systems may take a variety of forms. For example, one type of line control system, a step-type voltage regulator, is used to maintain a relatively constant voltage level in a power distribution system. Without such a regulator, the voltage level of the power distribution system could fluctuate significantly and cause damage to electrically powered equipment. Another common type of line control electrical apparatus is a circuit breaker or interrupter. Circuit protection devices typically detect when an undesirable condition, such as a ground fault or overcurrent, occurs on the line and disconnect power to loads on the protected line when the condition is detected.

Line control systems that handle larger loads often include two distinct parts: an actuator (such as a step-transformer or circuit breaker mechanism) and a controller (such as a voltage regulator controller, trip unit, or protective relay). The actuator includes the mechanism or other means by which the line voltage and/or current is varied (e.g. turned off, or stepped up and down). The controller includes logic (such as a microprocessor and control program) that determines how and when the line voltage is to be varied by the actuator.

In order for the actuator and the controller to work together to maintain the proper line characteristics, the controller is commonly provided with the specifications of the actuator. For example, information such as the actuator's voltage rating, current rating, configuration and impedance characteristics may be programmed into the controller. In voltage regulation systems, information such as number of tap changes and temperature extremes may also be maintained by the controller so that a field engineer can determine when to change or service the voltage regulator.

The problem with maintaining such information at the controller is that each time a new controller or actuator is put in place, the controller may need to be reprogrammed by the field engineer. This process can be time consuming and prone to entry errors. When the actuator is changed, information is typically read from the data plate or manual and parameters are keyed into the controller by hand. In cases where the controller is changed, historical data concerning the actuator are commonly re-keyed or transferred from one controller to another.

SUMMARY OF THE INVENTION

According to the present invention an electrical apparatus actuator, such as voltage regulator transformer or circuit breaker mechanism, is provided with a personality module which stores operational information concerning actuator operation. The apparatus controller reads from and writes to the personality module by way of a communications link.

Advantageously, when a new controller or actuator is installed at a site, the controller can immediately read the operational information about the actuator, which is stored in the personality module, and adapt its operational interaction with the actuator based at least in part on the operational information. Further, the controller can update the personality module as appropriate.

One embodiment of the present invention is directed to an actuator device for an electrical power distribution system line control apparatus, comprising: a housing; actuation means, mounted in the housing, for changing a line voltage on an electrical line; an electronically reconfigurable memory device mounted in the housing; and means for storing operational information relating to the actuator device in the memory device.

Another embodiment of the present invention is a line control apparatus for an electrical power distribution system comprising: an actuator device, coupled to an electrical distribution system, for changing line voltage thereof, the actuator device including an electronically reconfigurable memory device having stored therein operational information relating to the actuator device; and a controller for operating the actuator device, which is electrically and selectively coupled to the actuator, including the memory device, wherein the controller accesses the memory device and adapts its operational interaction with the actuator in conformance with the operational information.

The present invention is also directed to an electrical power distribution voltage regulation system, including a voltage regulator including a housing; a step transformer mounted in the housing; a tap changer mounted in the housing and coupled to the step transformer; an electrically reconfigurable memory device, mounted in the housing, for storing therein operational information relating to the voltage regulator. This embodiment also includes a controller coupled to the step transformer, the tap changer and the memory device, the controller including means for reading and updating operational information stored in the memory device and means for controlling the tap changer based at least in part upon the operational information.

Another embodiment of the present invention is a circuit protection device comprising: a power control apparatus for selectively disconnecting power to a portion of an electrical distribution system, the apparatus including an electronically reconfigurable memory device, capable of storing therein operational information relating to the power control apparatus. This embodiment of the invention also includes a controller coupled to the power control apparatus including the memory device, the controller including means for reading and updating operational information stored in the memory device, and means for controlling the power control apparatus based at least in part upon the operational information.

The present invention is also directed to a line control apparatus for an electrical power distribution system, including an actuator device coupled to an electrical distribution system, mounted in the housing, for changing line voltage thereof, the actuator device including an electronically reconfigurable memory device having stored therein operational information relating to the actuator device. This embodiment of the invention also includes a controller coupled to the actuator device and in communication with the memory device for operating the actuator device, for adapting its operational interaction with the actuator device based at least in part on the operational information and for changing the stored operational information.

The present invention is also directed to controllers for a line control apparatus for an electrical power distribution system having an actuator device coupled to an electrical distribution system, for changing line voltage thereof, the actuator device including an electronically reconfigurable memory device having stored therein operational information relating to the actuator device. The controller has a microprocessor coupled to the actuator device and in communication with the memory device, for executing control programs for operating the actuator device, for adapting its operational interaction with the actuator device based at least in part on the operational information and for changing the stored operational information.

BRIEF DESCRIPTION OF THE DRAWINGS

FIG. 8 is a block diagram showing an application of the present invention to a circuit breaker and trip unit or protective relay controller of a type suitable for use with a personality module.

Like reference numerals appearing in more than one figure represent like elements.

DETAILED DESCRIPTION OF THE PREFERRED EMBODIMENTS

Figure 1:
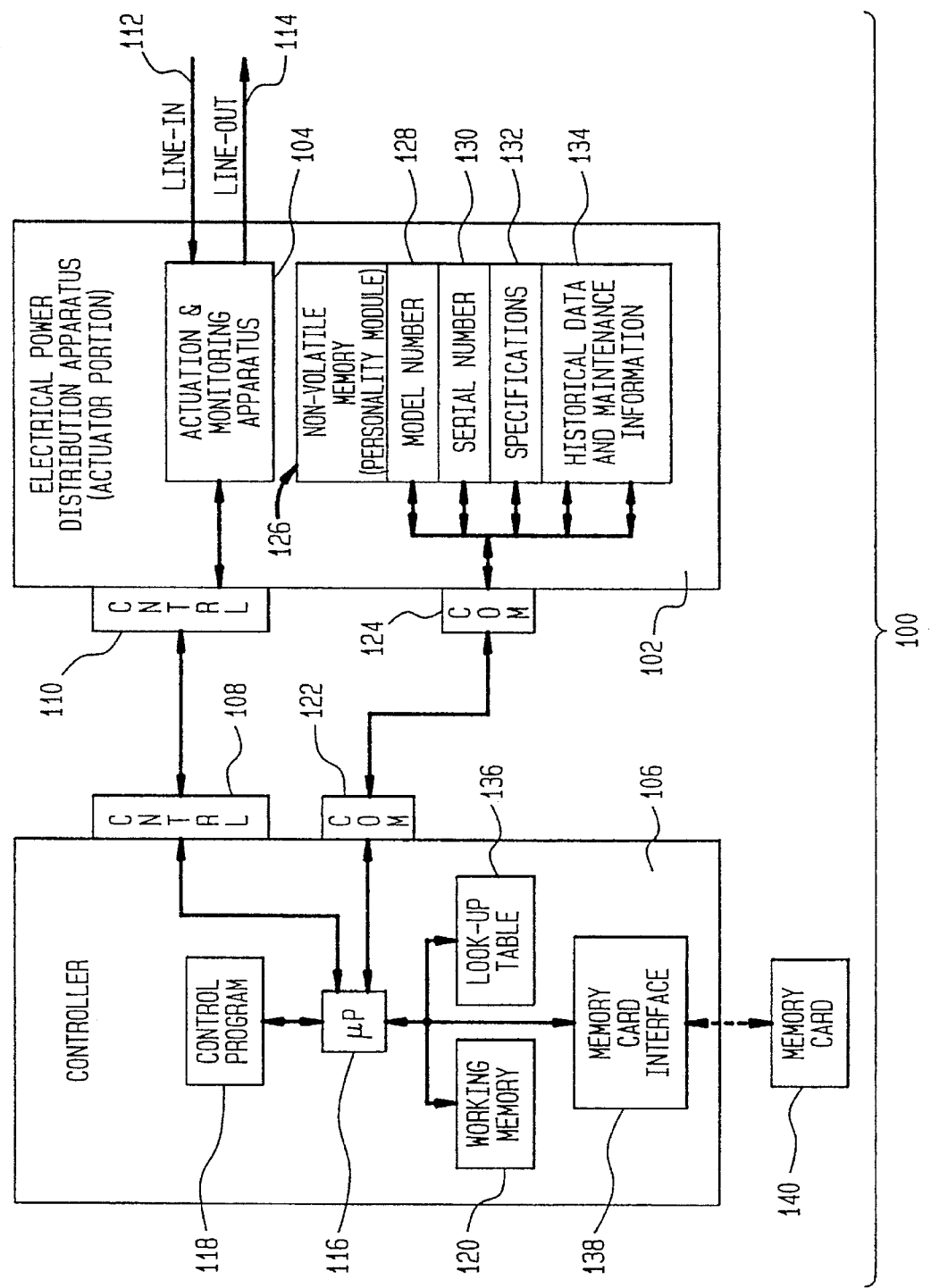
FIG. 1 is a generalized block diagram showing an embodiment of the electrical apparatus line actuation system of the present invention.

A generalized embodiment of the present invention is illustrated in FIG. 1. A generalized electrical power distribution system line control apparatus 100, including an actuator device portion 102, such as a voltage regulator or circuit breaker mechanism. The actuator device 102 includes an actuation and monitoring apparatus 104 which operates under control of signals generated by a controller 106. The controller 106 and the actuator 102 are electrically connected by way of control ports 108, 110. The actuation and monitoring apparatus 104 monitors various parameters on a connected electrical line 112 and protects the circuits and devices that receive power from the output side 114 of the line.

The controller 106 includes a microprocessor 116 which operates under control program 118. The control program 118 receives line parameters passed through from the actuation and monitoring apparatus 104 and makes control decisions (such as when to change a tap on a voltage regulator or when to trip a circuit breaker) based on the line parameters and threshold data stored in a working memory 120. The control decisions are also made, at least in part, based on the specifications or type of actuator to which the controller is connected.

According to an embodiment of the present invention, the controller 106 and actuator 102 each preferably include a serial communications port 122, 124, respectively. The actuator 102 additionally includes a memory device 126 which is accessible by the controller 106. The memory device 126 is preferably a non-volatile read/write memory (often referred to herein as a "personality module") which is coupled to the communications port 124. The personality module 126 preferably has a data communications capability (such as read/write access to individually addressable memory locations via a serial communications port). The DS199x-R3 series Touch Memories available from Dallas Semiconductor of Dallas, Tex., USA are suitable for use as the personality module 126. In the embodiment of FIG. 1, communication with the personality module 126 is accomplished via the communication port 124 of the actuator 102.

An important purpose for the personality module 126 is to store operational information which remains resident in the housing of the actuator 102, which may be accessed by any controller 106 which is utilized to operate the actuator 102 or understand past operational history of the actuator. Any controller 106 which is used to operate the actuator 102 adapts its operational interaction with the actuator at least in part based on the operational information which it accessed in the personality module 126. The personality module 126 may store and maintain circuit actuator 102 operational information, such as:

a. model number 128;
  b. serial number 130;
  c. specifications 132, including by way of example:
     voltage and current ratings (e.g. short time ratings, full load current ratings, etc.);
     configuration characteristics;
     phase and/or ground sensor ratings, types and calibration;
     impedance characteristics;
     number of phases;
     coarse current adjustment;
     trip and/or alarm only output device selection settings;
     other actuator settings; and
  d. communications addresses where apparatus controllers are used in a networked configuration.

The personality module 126 may also archive historical and maintenance operational information 134, such as:

a. total interrupting current;
  b. number of trips, number of breaker operations or number tap change operations;
  c. temperature extremes;
  d. trip log information for interruption events;
  e. accumulated number of interrupted amps of current for each individual phase;
  f. dates of maintenance, manufacture and installation;
  g. actuator, e.g. circuit breaker, opening and closing times, opening and closing velocities, breaker charging motor performance; and
  i last current interrupted.

The personality module 126 is securely mounted within the housing of the actuator 102 and is protected from the external environment. Locating the personality module 126 in the circuit actuator housing enables the controller 106 to be changed without impacting the personality module 126.

The controller 106 includes a non-volatile look-up table 136 (e.g. embodied in read-only-memory) which is readable by the microprocessor 116. The look-up table 136 includes a cross reference between actuator device model numbers and the appropriate control parameters for the models. Similarly, the look-up table 136 can include information on control parameter modifications that are specific to a particular serial number or range of serial numbers for a given model.

If desired, the controller 106 may also include a data interface, such as for example, a memory card interface 138 coupled to the processor 116. The memory card interface 138 provides data exchange between the processor and a removable, field programmable data memory storage module (memory card) 140. The memory card 140 has read/write capability and is used, for example, to store controller data for later retrieval, to update the configuration parameters of the controller, or to provide program code so that the processor 116 can run non-resident algorithms or perform updates or revisions to the processor's resident control program 118. The memory card interface 138 is preferably embodied as a Personal Computer Memory Card International Association (PCMCIA) interface with a slot, externally accessible via an opening in the controller housing (see, e.g. opening 320 in the embodiment shown in FIG. 3), for receiving a PCMCIA standard memory card 140.

In order to read the data in the personality module 126, the microprocessor 116 provides the personality module with a read command and series of addresses. The contents of each memory location are defined by convention so that the controller understands the meaning of the returned data; e.g. addresses 0–7 hold the model number, addresses 8–15 hold the serial number, addresses 16–115 hold the specifications, addresses 116–215 hold the historical data, etc.

The microprocessor 116 also writes to the personality module 126 in accordance with the convention. Specifically, the microprocessor 116 updates the historical data 134 in the personality module as needed. For example, whenever a voltage regulator tap change or circuit breaker trip occurs, the controller 106 updates the historical data 134 by writing the total number of tap changes or trips to the appropriate address location in the personality module 126. A field engineer can also initialize a new (replacement) personality module 126 by programming in the base operational information 128–134 via the controller 106.

Figure 2:
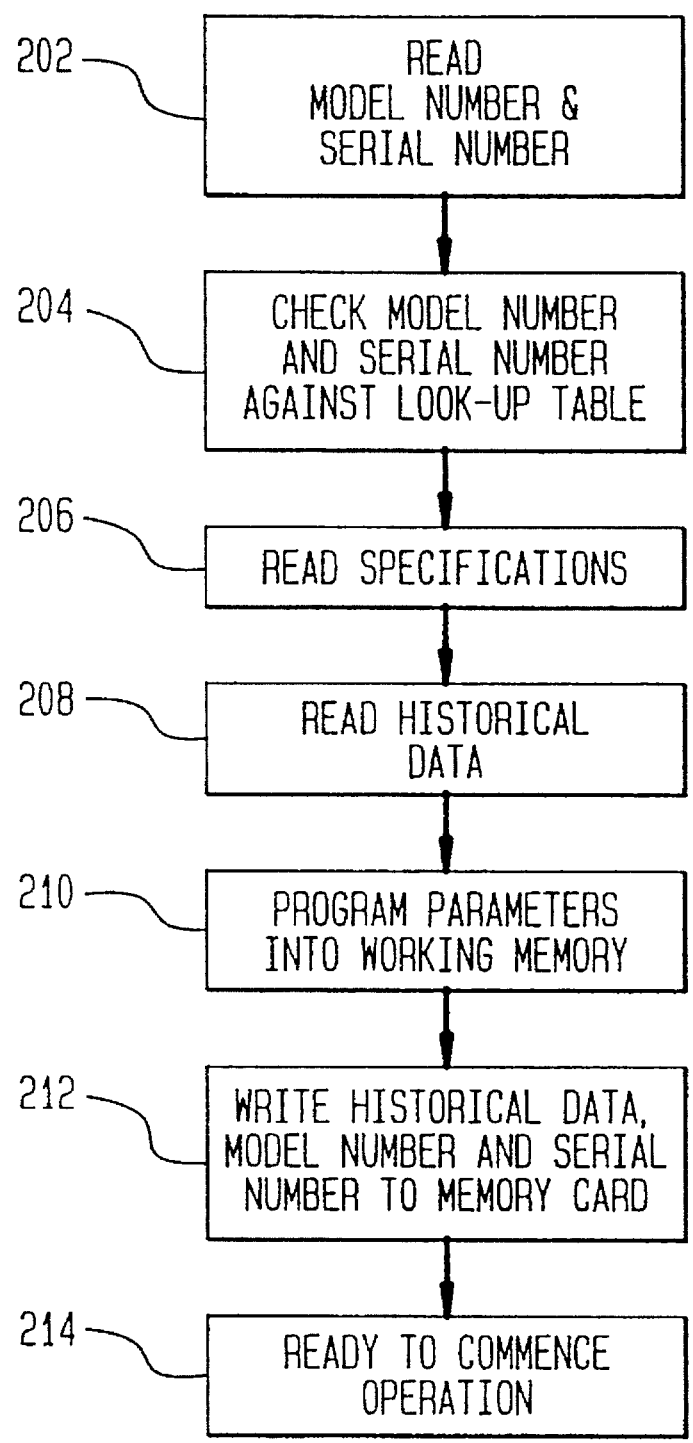
FIG. 2 is a flow chart of the operation of the personality module of the present invention in conjunction with the electrical apparatus line actuation system of FIG. 1.

The cooperation between the controller 106 and the personality module 126 is illustrated in FIG. 2. The controller communicates with the personality module via the communication ports 122, 124. When the controller 106 is initialized, in step 202 it reads the model number 128 and serial number 130 which are stored in the personality module 126. In step 204, the controller checks these against the look up table 136 to determine a base set of operational parameters.

Next, in step 206, the controller 106 reads the specifications 132 from the personality module 126. The specifications include information such as voltage ratings, current ratings, and impedance characteristics.

The specifications can be used in a number of ways. For example, where the base set of operational parameters has been determined by way of cross referencing the model number in the look up table 136, the specifications can be used to update the parameters based on specific operational characteristics of the actuator 102. The specifications can be written to the personality module 126 by a field engineer via the controller 106. Alternatively, the specifications can be used by the controller 106 to determine the control program's 118 operational parameters in cases where (a) a model number has not been provided in the personality module or (b) the model number can not be found in the look-up table.

In step 208 the controller 106 reads the historical data 134 from the personality module 126. The historical data include information such as total interrupting current (e.g., for circuit breakers), number of tap changes (e.g., for voltage regulators) and temperature extremes. This information is integrated into the controller's memory 120 where it is used to set the initial values of these measured parameters.

It should be understood, that at least one of the model number or specifications themselves should be supplied in order for the controller 106 to obtain the proper operating parameters. Serial number information can be used to obtain more specific specifications or to program the controller 106 to work with parameters that are sensitive to the particular revision level of the controller.

In step 210, the controller 106 programs the parameters determined by reading the model number, serial number, specifications and historical data into it's working memory 120.

Optionally, in step 212, the controller 106 can be programmed to write the historical, specification, make and model number data and other information (such as diagnostic results) to the memory card 140 so that the field engineer can bring the data back to the home office. Once the parameters have been integrated into the controller's memory 120 for use by the control program 118, in step 214 the controller 106 is ready to commence operation.

The controller 106 writes to the personality module 126 to update the historical and maintenance data 134. This is accomplished by providing the personality module 126 with a write command and the appropriate addresses via the serial ports 122, 124. For example in voltage regulator applications, each time the controller 106 detects a tap change it writes a new total tap change number to the personality module 126. Similarly for circuit breaker applications, other measured values such as the total interrupting current and temperature extremes are also periodically written to the controller 106. The historical data can be written every time a new value is determined or at periodic time intervals.

Figure 6:
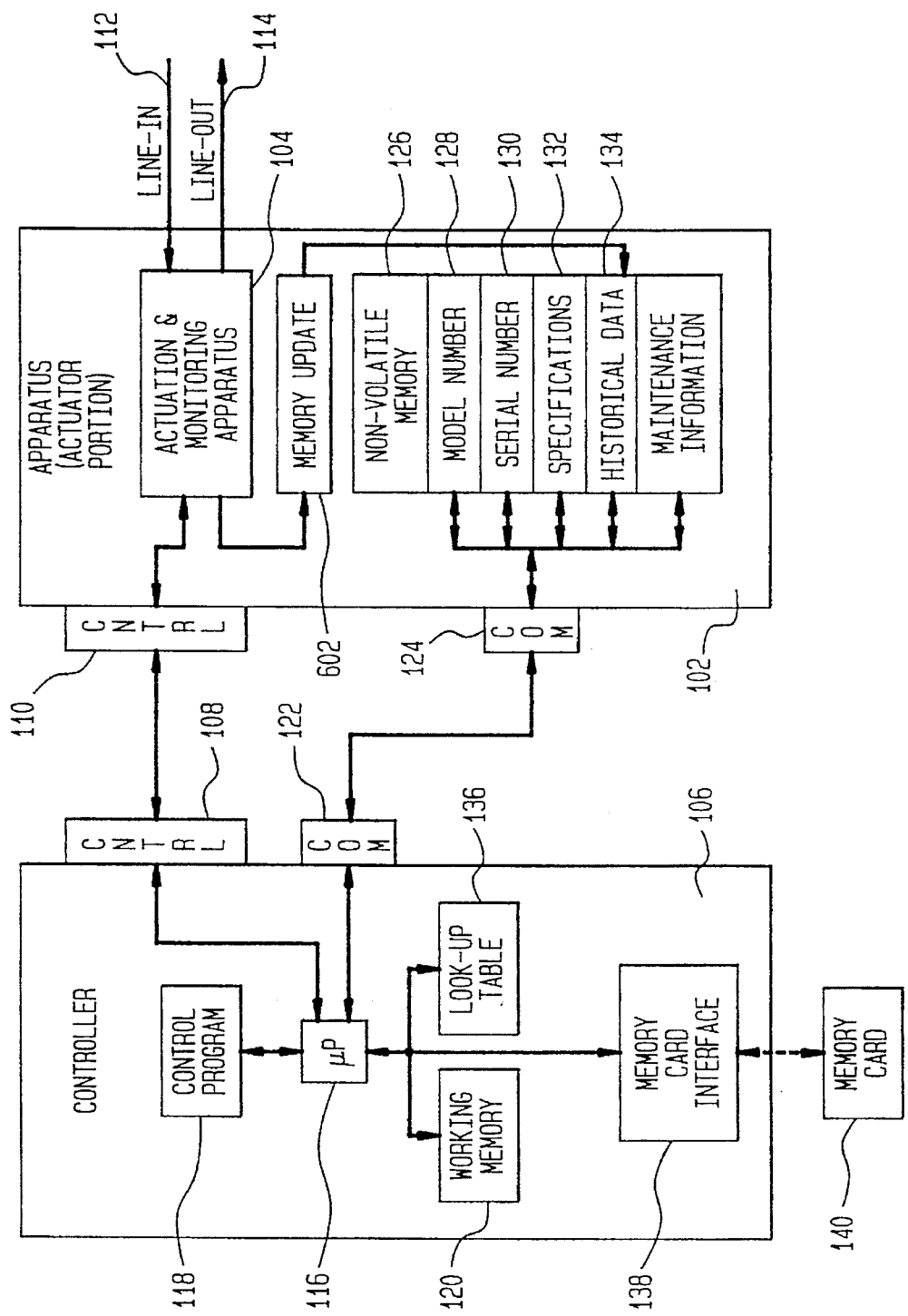
FIG. 6 is a generalized block diagram showing an alternative embodiment of the present invention.

It should be understood that the controller 106 need not perform all of the updates to the historical data. As illustrated in FIG. 6, the actuator 102 can be provided with memory update logic 602, which writes updated historical data indicative of the operation of the actuation and monitoring apparatus 104 to the personality module 126. The memory update logic 602 can be responsible for writing all of the historical data to the personality module 126 or it can share that responsibility with the controller 106 (e.g., the controller writes some types of data while the memory update logic writes other types, or one or the other will do the writing depending on a specific event), based on the application.

The personality module 126 can also be used in conjunction with the memory card interface 138. When a new controller 106, actuator 102 or other part is installed, the field engineer can download the personality module data to the memory card 140. This is accomplished by the engineer entering a command via a keypad on the controller 106 or a remote terminal. Upon receiving the download command, the microprocessor 116 reads the personality module 126 data via the communications port 122 and writes the data to the memory card 140. In addition, the microprocessor 116 can also write data to the memory card 140 concerning the state of the controller 106 and the results of internal diagnostics. The memory card 140 can then be carried to another site, such as the lab or main office, for full analysis. Thus, engineers at a remote site will know the operational information, such as the operational history, specifications, make and model number of the controller 106 and actuator 102, user programmed parameters (such as thresholds and setpoints) as well as the results of any diagnostics run by the controller 106.

Figure 3:
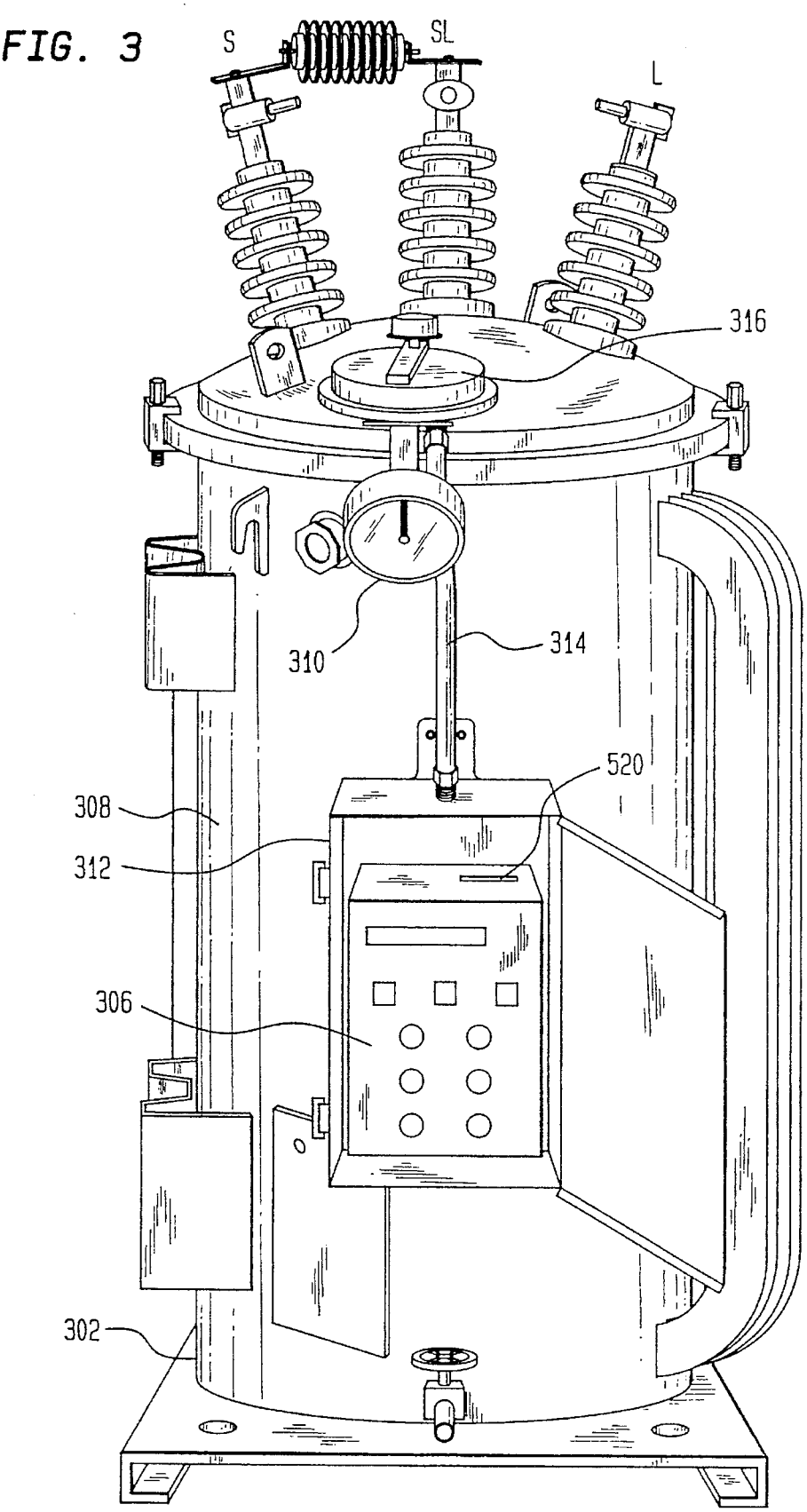
FIG. 3 shows an application of the present invention to a voltage regulator and controller of a type suitable for use with a personality module.

A specific embodiment of the present invention within a voltage regulator will now be described by reference to FIGS. 3 through 5. A step-type voltage regulator 302 and its associated controller 306 are shown in FIG. 3. The voltage regulator 302 can be, for example, a Siemens Energy & Automation, Inc. JFR series regulator. The windings and other internal components that form the transformer are mounted in an oil filled tank 308. The tap changing mechanism (not shown in FIG. 3) is sealed in a separate chamber in a portion of the tank 308. The various electrical signals generated by the transformer are brought out to a terminal block and external bushings S, SL, L for access. The terminal block is preferably covered with a waterproof housing 316 which can also be used to house the personality module 126 (not shown in FIG. 3). An indicator 310 is provided so that the position of the tap as well as its minimum and maximum positions can be readily determined.

The voltage regulator controller 306 includes a memory card connector 520 (see also FIG. 5) for receiving a standard PCMCIA memory card. The memory card connector 520 is electrically connected to a PCMCIA memory card interface 138 (FIGS. 4 & 5) disposed internally in the controller housing. The memory card and memory card interface can be, for example, of the type described in U.S. patent application Ser. No. 08/101,133 filed on Aug. 2, 1993 and assigned to the same assignee as the present invention. A cabinet 312 is typically secured to the tank to mount and protect the voltage regulator controller 306. The tap changing mechanism (not shown in FIG. 3) is sealed in a separate chamber in lower portion of the tank 308. The cabinet 312 includes a door and is sealed in a manner sufficient to protect the voltage regulator controller 306 from the elements. Signals carried between the transformer or tap changing mechanism and the voltage regulator controller 306 are carried via conductors within an external conduit 314.

Figure 4:
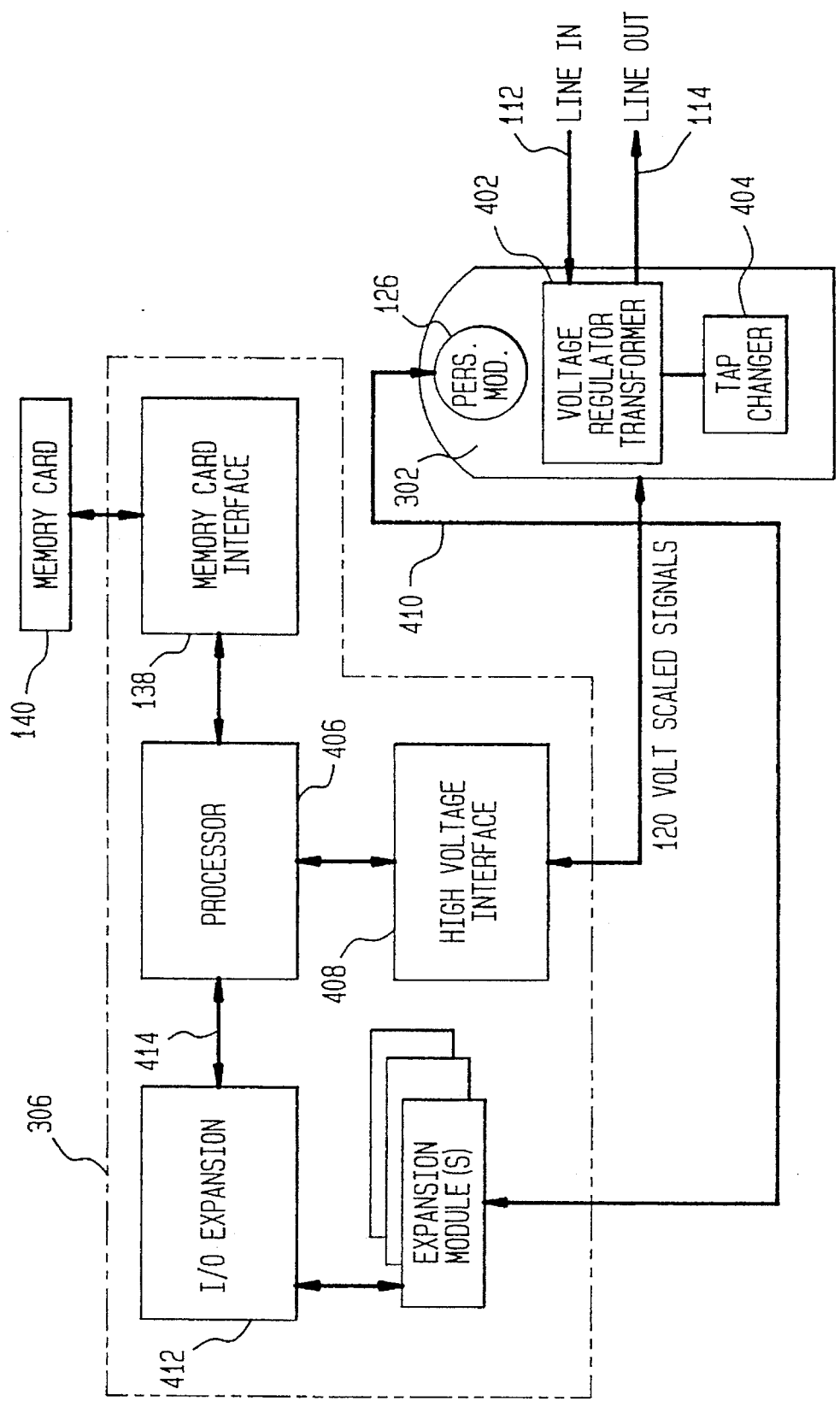
FIG. 4 is a more detailed block diagram of the voltage regulator and controller of FIG. 3.

The voltage regulator 302 and voltage regulator controller 306 are illustrated in more detail in FIG. 4. The voltage regulator 302 includes a multi-tap transformer 402 and an associated tap changer 404. The tap changer 404 is controlled by the voltage regulator controller 306 which receives signals indicative of voltage and current in the windings of the transformer 402 and conventionally generates tap control signals in accordance with user programmed set-points and thresholds for these signals. The voltage regulator 302 is also provided with a personality module 126. The personality module 126 is of the type described with respect to FIG. 1 and stores statistics and historical information relating to the voltage regulator.

The voltage regulator controller 306 includes a processor section 406, a high voltage interface 408, a memory card interface 138 and an I/O expansion chassis 412 which is coupled to the processor section 406 by way of an SPI bus 414. An expansion option module of the expansion chassis 412 is electrically connected to the personality module 126 by way of a conventional serial communications cable 410. The I/O expansion chassis and associated plug-in I/O modules can be, for example, of the type described in U.S. patent application 08/120,720; filed on Sept. 13, 1993 and assigned to the same assignee as the present invention.

The processor section 406 generates digital control signals based on internal program code and user selected parameters entered (by a user) via the controller's front panel. In operation, high voltage signals are generated by the voltage regulator transformer 402. These signals are scaled down via internal transformers (not shown) and provided to the high voltage interface 408. The high voltage interface 408, in turn, further scales the transformed down signals for reading by an analog to digital converter 502c (shown in FIG. 5) within the processor section 406. The data fed back from the voltage regulator 402 are used by the processor section 406 to make tap change control decisions and to provide indication of various conditions to a user.

The memory card interface 138 is disposed in the controller 306 housing so that it is externally accessible via a slot 520 (FIG. 3) formed in the housing wall. Field changes to the controller's 106 configuration information or the processor section's 406 resident program can be made by a user plugging a memory card 140 into the memory card interface 138 and invoking a command from the regulator controller's keypad 512 (FIG. 5). The memory card 140 can be left plugged in, for example to collect data or provide a control program, or it can be inserted briefly to transfer information to or from the controller 306.

Figure 5:
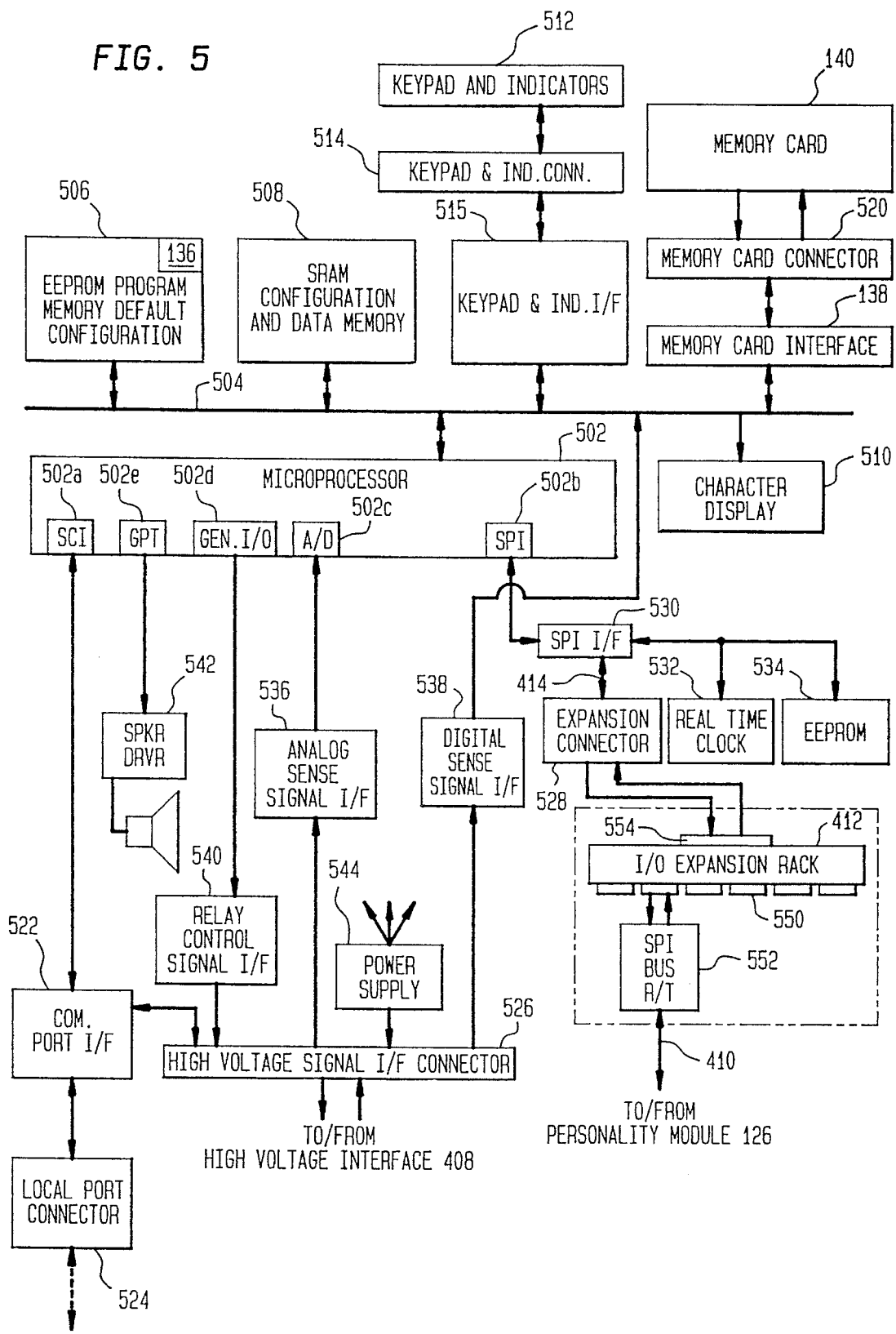
FIG. 5 is a more detailed block diagram of the processor board of FIG. 4 showing its connection to the I/O expansion section, a personality module and the memory interface.

A more detailed block diagram of the processor section 406 and its interconnection with the memory card interface 138 and memory card 140 is illustrated in FIG. 5. The processor section 406 includes a microprocessor 502 (for example, a Motorola 68HC16) which is coupled to the other processor elements by way of a common bus 504. An electrically erasable programmable read only memory (EEPROM) 506 includes the microprocessor's program instructions, a look-up table 136 as described with reference to FIG. 1 and default configuration data.

A static type random access memory (SRAM) 508 stores user programmed configuration data and includes an area for the microprocessor 502 to store working data. The data from the personality module 126 are loaded into the SRAM 508 when the processor section is initialized. The microprocessor then executes the steps of FIG. 2 and loads the working parameters (thereby determined) into the SRAM 508.

The microprocessor 502 also communicates with an alphanumeric character display 510, a keypad and indicators (front panel) 512 and the memory card interface 138. The memory card interface 138 is of the same type described with respect to FIG. 1.

The keypad/indicators 512 are coupled to the bus 504 via a connector 514 and a bus interface 515. As previously described, a memory card 140 can be coupled to the bus 504 by way of a conventional PCMCIA standard interface 138 and connector 520.

Operational parameters, setpoints and special functions including metering parameters and local operator interfacing are accessed via the keypad 512. The keypad 512 is preferably of the membrane type; however any suitable switching device can be used. The keypad 512 provides single keystroke access to regularly used functions, plus quick access (via a menu arrangement) to all of the remaining functions.

The microprocessor 502 includes an SCI port 502a which is connected to a communication port interface 522. The communication port interface 522 provides the SCI signals to an external local port 524. An isolated power supply for the communication port interface 522 is provided by the high voltage interface 408 via high voltage signal interface connector 526.

The communication port interface 522 supports transfer of data in both directions, allowing the controller to be configured via a serial link, and also provides meter and status information to a connected device. In addition to supporting the configuration and data retrieval functions required for remote access, the communication port interface 522 supports uploading and/or downloading the program code for the microprocessor 502.

The communication port interface 522 can be, for example, an RS-232-compatible port. The local port connector 524 can be used for serial communication with other apparatus, for example a palmtop or other computer. The physical interface of the local port connectors 524 can be a conventional 9-pin D-type connector whose pin-out meets any suitable industry standard.

The microprocessor 502 also includes an SPI port 502*b* which is connected to an expansion connector 528 by way of an SPI interface 530. The expansion connector 528 brings the SPI bus 414 out to the I/O expansion rack/chassis 412 via a cable. Other devices that reside on the SPI bus include a real time clock (RTC) 532 and a serial EEPROM 534. The serial EEPROM 534 stores user programmed configuration data. The user programmed configuration data are downloaded to the SRAM 508 by the microprocessor 502 when the processor section 406 is initialized. The SRAM 508 copy is used, by the microprocessor 502, as the working copy of the configuration data. The real time clock 532 is programmed and read by the microprocessor 502.

The high voltage signal interface connector 526 provides a mating connection with a connector on the high voltage interface 408. Scaled analog signals from the high voltage interface 408 are provided to an A/D converter port 502*c* by way of an analog sense signal interface 536. The analog sense signal interface 536 low pass filters the scaled analog input signals prior to their provision to the A/D converter port 502*c*. Digital signals from the high voltage interface 408 are provided to the bus 504 via a digital sense signal interface 538. The digital sense signal interface 538 provides the proper timing, control and electrical signal levels for the data.

Control signals from the microprocessor's general I/O port 502*d* are provided to the high voltage signal interface connector 526 by way of a relay control signal interface 540. The relay control signal interface 540 converts the voltage levels of the I/O control signals to those used by the high voltage interface 408. A speaker driver 542 is connected to the GPT port 502*e* of the microprocessor 502. The processor section 406 also includes a power supply 544 which provides regulated power to each of the circuit elements of FIG. 5 as needed. The high voltage interface 408 provides an unregulated power supply and the main 5 volt power supply for the board of the processor section 406.

The microprocessor 502 recognizes that a memory card 140 has been plugged into the memory card interface 518 by monitoring the bus 504 for a signal so indicating. In response, the microprocessor 502 reads user selected control parameters entered via the controller's keypad 512. Depending on the control parameters, the microprocessor either updates the programming code in its program memory EEPROM 506, executes the code from the memory card 140 while it is present but does not update its EEPROM 506, or dumps selected status information to the memory card 140 so that it can be analyzed at a different location. As an alternative embodiment, the processor section 406 can be programmed to default to the memory card program when the presence of a memory card is detected. In this case, upon detection, the program code from the memory card would be downloaded to the SRAM 508 and executed by the microprocessor from there.

The I/O expansion chassis (rack) 412 includes a number of connectors 550 (e.g., 6) for receiving field installable, plug-in I/O modules 552. The connectors 550 are electrically connected to the SPI bus 414 via a common processor section interface connector 554 and couple the I/O modules 552 to the SPI bus 414 when they are plugged into the chassis.

The microprocessor 502 determines which devices are present in the I/O expansion chassis 412 by executing a conventional polling sequence when the controller 306 is initialized. At initialization, the microprocessor 502 polls the SPI bus 414. Each module present in the expansion chassis 412 responds with a code indicative of what type of device it is (e.g. a synchronous or asynchronous communications interface). The microprocessor 502 compares this code with a look up table in the EEPROM 506 to determine what type of device has responded and which task should be used to handle the device. The microprocessor 502 then activates the appropriate task (determined from the look-up table) and passes it the address of the device. As is known in the art, polling information can include additional configuration data depending on the complexity of the device.

As previously discussed, the voltage regulator 302 is provided with a personality module 126 which stores statistics and historical information on the voltage regulator. The regulator controller 306 processor section 406 reads from and writes to the personality module 126 by way of a serial link. Thus, when a new regulator controller 306 is put in place on a site it can immediately read the operational information, such as operational specifications and history of the voltage regulator transformer and tap changing mechanism, by adapting its operational interaction with the regulator 302 in conformity with the operational information. Further, the regulator controller 306 can update the personality module 126 as appropriate. As previously discussed, the personality module 126 is located on the regulator transformer assembly 302 in order to enable the regulator controller 306 to be changed without impacting the personality module 126. The regulator controller 306 writes to the personality module 126 each time a tracked event occurs and updates the historical data 134 accordingly.

The processor section 406 can communicate with the personality module 126 in a number of ways. For example, the microprocessor 502 can be provided with conventional RS-232 interface circuitry to the SCI 414 bus or the data bus. A conventional RS-232 cable can then be used to connect this RS-232 interface to an RS-232 interface on the personality module. Alternatively, an I/O module embodied as a serial peripheral bus receiver/transmitter (SPI Rx/Tx) can provide the physical and electrical interface between the SPI bus 414 and a cable connected to the personality module.

Figure 7:
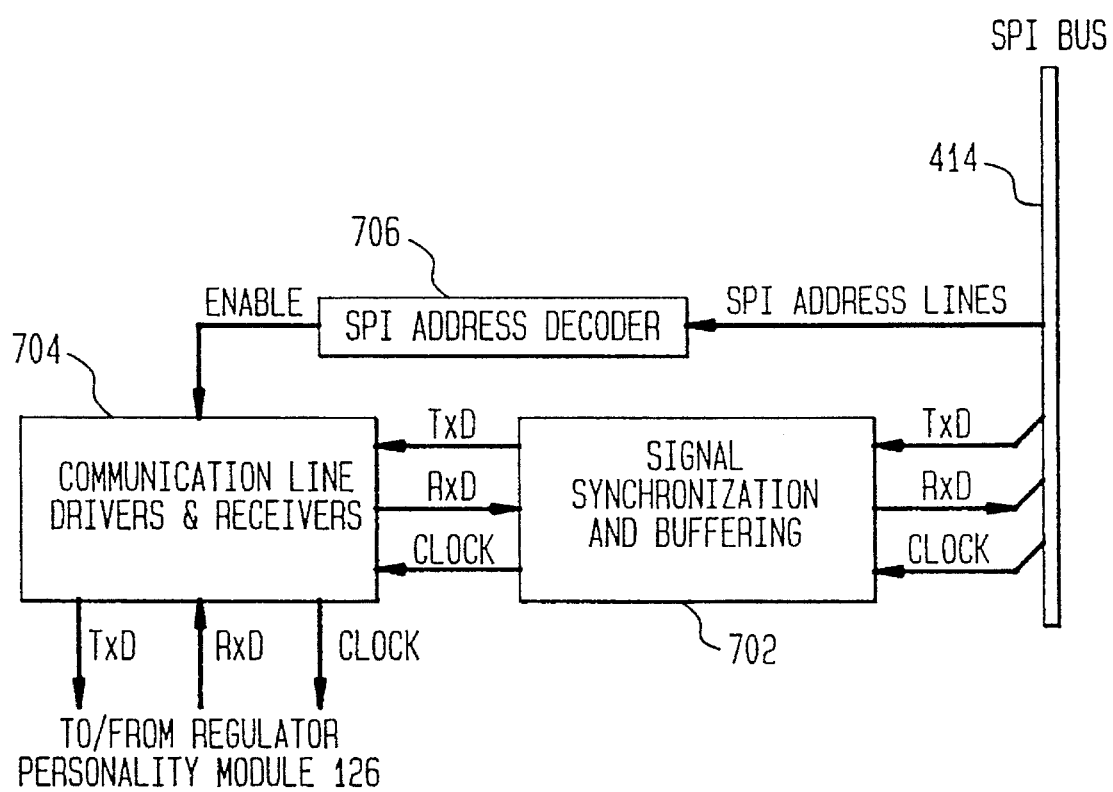
FIG. 7 is a block diagram of an I/O module suitable for providing data communication between the processor section and personality module of FIG. 4.

An embodiment of a suitable SPI Rx/Tx is illustrated in FIG. 7. The SPI Rx/Tx I/O module provides electrical signal translations, for example RS-232 (interfacing with the personality module) to 5 volt logic (interfacing with the microprocessor 502). Specifically, the SPI Rx/Tx includes signal synchronization and buffer logic 702 which translates and synchronizes SPI bus signals with data communication signals used by the personality module.

The synchronization and buffer logic provides transmitted data (TxD) and clock signals to line buffers 704, which translates signals between the communication line standard voltage levels and the voltage levels used by the synchronization logic 702. The SPI Rx/Tx also includes address decoding logic 706 which determines when the SPI Rx/Tx has been selected by the SPI bus and turns on and off the buffers 704 accordingly. It should be understood the communication and bus interface circuitry of the SPI Rx/Tx is conventional and known to those of ordinary skill in the art. The SPI Rx/Tx can be embodied to provide a synchronous or an asynchronous interface in accordance with the communication standard used by the personality module 126.

Advantageously, the personality module 126 provides a convenient means for identifying an actuator 102 and its characteristics in an electronic format. It improves the ability to maintain and track the actuator 102. It enables controllers 106 to read the actuator 102 configuration and specifications and therefore reduce the number of configuration items that need to be keyed into the controller. It also reduces the probability that a controller 106 will be configured incorrectly for a given actuator application.

FIG. 8 shows an embodiment of the personality module of the present invention in a circuit protection device line control apparatus 100' embodiment, such as a low, medium, or high voltage circuit breaker or interrupter. Subcomponents of the circuit breaker which have functional and operational features similar to those previously described for other apparatus embodiments of FIGS. 1, 4, and 5 are denoted herein with a prime "'" designation immediately following the identification number.

The circuit protection device 100' has an electromechanical power control apparatus 102' in the nature of a circuit breaker or interrupter and a controller portion, which is often referred to in the industry as a trip unit or protective relay 106'. The generalized circuit protection-specific system architecture and operation of the circuit protection device 100' described herein is intended to be a generic representation of known devices which monitor line current and voltage and trip the circuit breaker in response to monitored parameters.

Power is fed to the apparatus 102' via the line 112' input and out of the apparatus to a load via load 114' output. Electromechanical contacts, shown schematically as 115, driven by the apparatus actuation circuit 116', e.g., a trip coil and mechanical linkage, open or close the line 112' and load 114' circuit. Other devices, such as the position of well-known 52A and 52B switches in medium and high voltage circuit breakers and interrupters, may be monitored by apparatus internal monitoring circuits 118'. The apparatus 102' also has a data memory module 126' for storing previously-described types of operational information pertinent to the apparatus 102'.

The controller or trip unit or protective relay portion 106' monitors current and/or voltage of the power line 112' which is being protected by the device 100' through measurement transducers 120' which generate signals representative of the power passing through the power line 112'. The measuring inputs interface 536' may include rectifier and analog-to-digital converter circuitry, so as to convert the transducer 120' signal to a format usable as an input to the microprocessor 502'. The trip unit or protective relay 106' performs its command and control functions to monitor line 112' power and cause operation of the circuit breaker contacts 115 through the microprocessor 502' performing programs and manipulating data stored in non-volatile memory, which may include EEPROM program and data memory 506', volatile data memory (RAM) 508' and nonvolatile control program and configuration memory (EPROM) 509'. Those skilled in the art will appreciate that the exact configuration and utilization of different types of electronic memory utilized within a trip unit or protective relay 106' will vary for each specific design.

The controller trip unit or protective relay 106' has a user interface including one or more of keypads, displays and indicators, 510', 512', 514' and 516' for communication with users. Other communications pathways between the trip unit or protective relay 106' and other devices may be accomplished through communications interface 522' coupled to local communications pathway 524' and optionally through network communications pathway 525', which network communications could for example be accomplished through the Siemens Energy & Automation, Inc. ACCESS™ communications system.

Apparatus control outputs circuitry 540' generates output command signals for operating the apparatus actuation circuit 116', e.g., a trip coil. The apparatus monitoring inputs circuitry 538' receives signals from the apparatus internal monitoring circuits 118', which are indicative of other parameters within the apparatus 102' being monitored by the trip unit or protective relay 106'.

The trip unit or protective relay 106' reads and/or writes operational information from or to the apparatus personality module 126' in one or more of the manners previously described with respect to other embodiments of the present invention. The controller trip unit or protective relay 106' is supplied with control power 544'.

Now that the invention has been described by way of the preferred embodiments, various modifications, enhancements and improvements which do not depart from the scope and spirit of the invention will become apparent to those of skill in the art. Thus, it should be understood that the preferred embodiment has been provided by way of example and not by way of limitation. The scope of the invention is defined by the appended claims.

What is claimed is:

1. In combination,
    (a) an actuator device for an electrical power distribution system line control apparatus, said actuator device comprising:
        (1) a housing;
        (2) actuation means, mounted in the housing, for changing a line voltage on an electrical line;
        (3) an electronically reconfigurable memory device mounted in the housing; and
        (4) means for storing operational information relating to the actuator device in the memory device, and
    (b) a controller for being mounted external to said housing, said controller comprising:
        (1) means for being coupled to the actuation means by a first control connection for controlling the actuation means,
        (2) means for being coupled to the memory device by a second communication connection,
        (3) means for reading said operational information stored in the memory device, and
        (4) means for subsequently adapting at least a part of its operational interaction with the actuator means responsive to said stored operational information.

2. The combination of claim 1, wherein operational specifications of the actuator device are stored in the memory device.

3. The actuator device of claim 2, wherein data identifying at least one of a type and a model number of the actuator device are stored in the memory device.

4. The actuation device of claim 2, wherein the operational specifications include at least one of voltage rating, current rating and impedance characteristics.

5. The combination of claim 1, wherein the actuation means for changing the line voltage is step-type voltage regulator transformer, and the stored operational information includes the total number of tap changes having been made by the transformer.

6. A controller for connection to and control of a line control apparatus for an electrical power distribution system, said controller controlling operation of said line control apparatus responsive to operational information relating to said apparatus and stored by said apparatus, said line control apparatus comprising an actuator device coupled to an electrical distribution system, for controlling line voltage therein responsive to control commands provided by said controller, and an electronically reconfigurable memory device having stored therein said operational information relating to the actuator device, and the controller comprising:

a microprocessor adapted to be coupled to and control the actuator device by a control connection, and adapted to be connected to the memory device by a communication connection, for reading said stored operational information therefrom, said microprocessor executing control programs for operating the actuator device, and said microprocessor adapting its operational interaction with the actuator device by updating said control programs responsive to the operational information read from said memory device and for thereafter updating the stored operational information.

7. A line control apparatus for an electrical power distribution system, comprising:

an actuator device, coupled to an electrical distribution system, for changing line voltage thereof responsive to control signals received from a controller, the actuator device including an electronically reconfigurable memory device having stored therein operational information relating to the actuator device, said actuator device and said memory device being mounted in a housing, said housing including at least one port for completion of control and communication connections between said actuator device and said memory device and a controller; and a controller for operating the actuator device, said controller being adapted to be mounted external to said housing and to be coupled to the actuator device and to the memory device by way of said at least one port to complete said control and communication connections to control the actuator device, whereupon the controller accesses the memory device and thereafter adapts its operation of the actuator in conformance with the operational information stored by the memory device.

8. An electrical power distribution voltage regulation system, comprising:

(a) a voltage regulator including:
a housing;
a step transformer mounted in the housing;
a tap changer mounted in the housing and coupled to the step transformer, said tap changer being responsive to commands provided by an associated controller by way of a control connection; and
an electrically reconfigurable memory device, mounted in the housing, for storing therein operational information relating to the voltage regulator and for supplying said operational information to said controller by way of a communication connection; and (b) a controller adapted to be mounted external to said housing, and to be coupled to the tap changer by way of said control connection for controlling the tap changer, and to the memory device by way of said communication connection, for reading and updating operational information stored in the memory device said controller comprising means for controlling the tap changer based at least in part upon the operational information read from the memory device.

9. The voltage regulation system of claim 8 wherein the operational information includes data indicative of a number of tap changes made by the step transformer.

10. The voltage regulation system of clam 8 wherein the memory device is capable of storing therein operational specifications of the voltage regulator.

11. The voltage regulation system of claim 10, wherein the memory device has stored therein data identifying a model number of the voltage regulator.

12. The voltage regulation system of claim 10, wherein the controller adapts its control of the voltage regulator in conformance with the operational specifications stored in the memory device.

13. The voltage regulation system of claim 10, wherein operational specifications are stored in the memory device, which include at least one of voltage rating, current rating and impedance characteristics, and wherein the controller includes means for controlling the tap changer based at least in part upon the operational specifications stored in the memory device.

14. The voltage regulation system of claim 8, wherein said operational information stored in the memory device includes information indicative of at least one of voltage regulator operational history and maintenance information.

15. A method for controlling an electrical power system line voltage control apparatus, said apparatus comprising an actuator for controlling the line voltage of an associated power distribution line, and a memory device for storing personalizing information concerning said apparatus, comprising the steps of:

connecting a controller to said actuator device by a control connection and to said memory device by a communication connection, said controller storing a control program for controlling apparatus of the class of said apparatus, said controller performing the following steps when connected to said apparatus:

reading said personalizing information from said memory device;

updating said stored control program in accordance with said personalizing information stored by and read from said memory device;

performing the steps of said updated control program for controlling said apparatus;

maintaining statistics describing the operation of said apparatus; and updating the information stored by the memory device of the apparatus responsive to said statistics.

* * * * *